Patented Feb. 24, 1925.

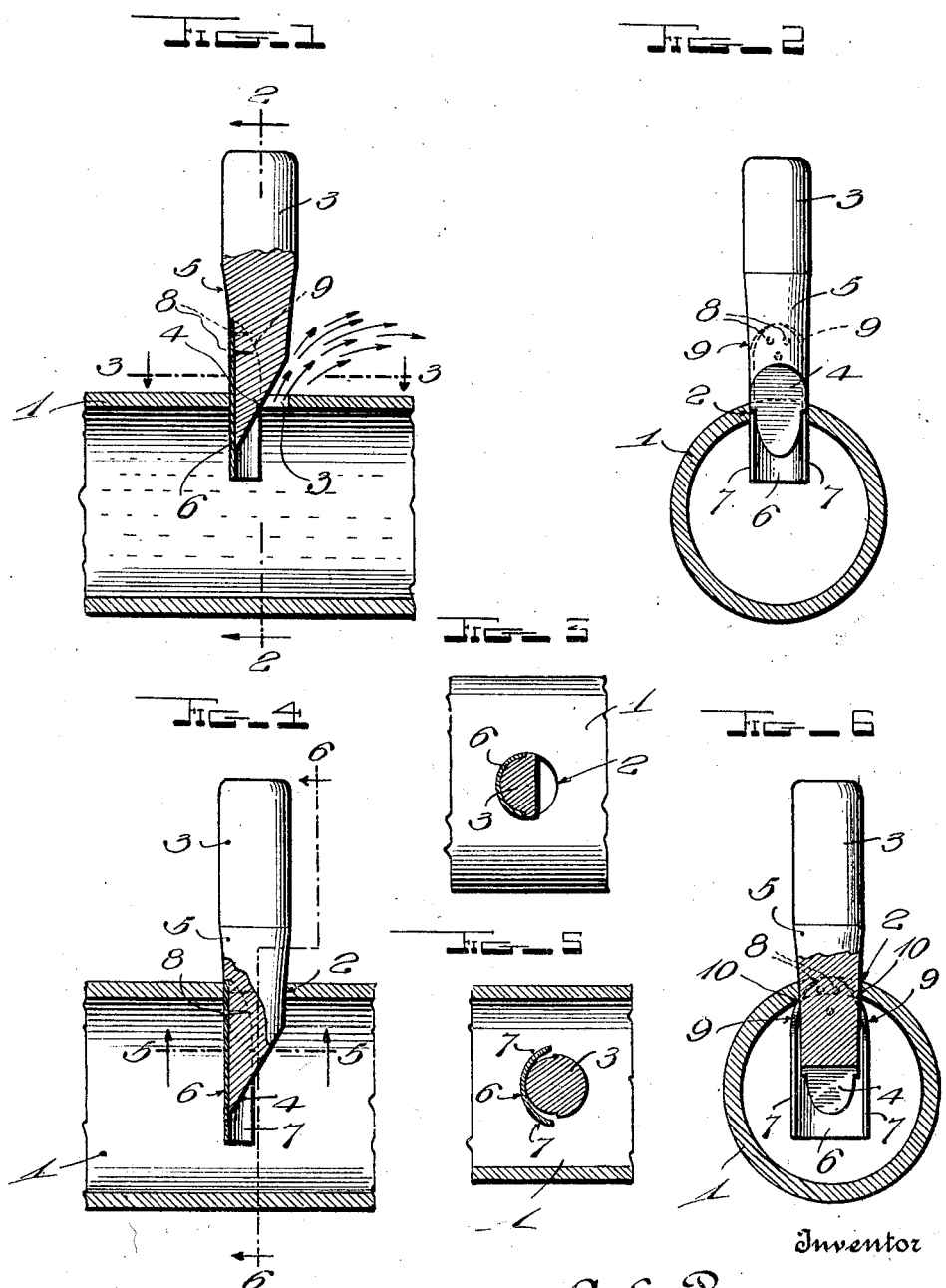

1,527,222

UNITED STATES PATENT OFFICE.

ALBERT E. RASMUSSEN, OF YAKIMA, WASHINGTON.

WATER-FLOW REGULATOR.

Application filed October 27, 1924. Serial No. 746,167.

*To all whom it may concern:*

Be it known that I, ALBERT E. RASMUSSEN, a citizen of the United States, residing at Yakima, in the county of Yakima and State of Washington, have invented certain new and useful Improvements in Water-Flow Regulators; and I do declare the following to be a full, clear, and exact description of the invention, such as will enable others skilled in the art to which it appertains to make and use the same.

For irrigating purposes, water pipes are frequently used having water discharge openings at spaced points, and rather crude, expensive and undesirable devices have heretofore been provided for permitting the desired quantity of water to escape from any opening or for entirely cutting off the discharge. It is the object of my invention to provide an extremely simple and inexpensive, yet a very efficient and desirable regulator for this purpose, embodying a plug insertible different distances into the pipe opening to permit the discharge of more or less water or to entirely cut off the flow, and unique resilient means carried by the plug to frictionally engage the wall of the pipe opening, so as to effectively hold the plug in any position to which it is moved.

With the foregoing in view, the invention resides in the novel subject matter hereinafter described and claimed, the description being supplemented by the accompanying drawing.

Figure 1 is a longitudinal sectional view showing the application of the invention for permitting a limited discharge of water.

Figure 2 is a transverse sectional view on line 2—2 of Fig. 1.

Figure 3 is a detail horizontal section on line 3—3 of Fig. 1.

Figure 4 is a view similar to Fig. 1 but illustrating the manner in which the flow of water may be entirely cut off, by inserting the plug to the maximum.

Figure 5 is a detail sectional view on line 5—5 of Fig. 4.

Figure 6 is a vertical transverse sectional view as indicated by the lines 6—6 of Figs. 4 and 5.

In the drawing above briefly described, the numeral 1 designates a water pipe having a circular discharge opening 2. For controlling the discharge of water through this opening or for entirely cutting off such discharge, I employ a plug 3 which is preferably formed of wood, said plug being suitably shaped so that when it is moved inwardly or outwardly to different positions, the discharge of water will be varied, and when said plug is forced inwardly to the maximum, the opening 2 will be tightly sealed. In the present showing, the inner end of the plug 3 is beveled as indicated at 4 for the purpose of varying the discharge of water when the plug is moved inwardly or outwardly, and said plug is preferably provided with a gradually tapered portion 5 to be wedged tightly in the opening, when the plug is forced inwardly to the maximum, for cutting off the discharge of water.

Resilient means is carried by the plug 3 for engagement with the wall of the opening 2, to frictionally hold the plug in any position to which it may be moved. This resilient means preferably is in the form of a non-corrodible, spring metal plate 6 which is curved about a portion of the plug, is secured to the latter and has a tendency to assume a position out of concentric relation with the plug, so as to effectively contact frictionally with the wall of the opening 2, to hold the plug in adjusted position. In the preferred form of construction, the plate 6 is provided with opposite edges 7 extending longitudinally of the plug, and this plate is secured substantially at its longitudinal center to said plug, by any suitable means such as the tacks 8, the edges 7 of the plate being left free so that they have a tendency to move outwardly from the plug, under the resiliency of the plate, as will be clear by reference to Figs. 5 and 6. When the device is to be inserted into the opening 2, it is necessary to spring the edge portions 7 of the plate 6 inwardly toward each other, so that said plate may enter the opening. Then, the normal tendency of these edge portions to move outwardly away from the plug, causes them to contact tightly with the wall of the aforesaid opening, so as to frictionally hold the plug in adjusted position.

When the plug 3 is forced inwardly to the maximum, to entirely cut off the discharge of water, the water within the pipe 1 has a greater tendency to blow the plug from the opening, than it has when discharge of water is permitted. I therefore shape the plate 6 so that it will then have greater efficiency for holding the plug against movement. To accomplish this result, the upper end portions 9 of the plate edges 7 are disposed in converging relation with each other, and these converging edge portions are adapted to contact, between their ends, with the lower extremity of the wall of the pipe opening 2, when plug 3 is forced inwardly to the position shown in Figs. 5 and 6. The portion of the plate 6 below the points 10, at which the edge portions 9 contact with the pipe, will expand under the resiliency of said plate, that is the edge portions 7 will force outwardly away from the plug as indicated in the figures referred to, and when the device is in this condition, it tenaciously holds the plug against outward movement, until it is forcibly pulled. Thus, there is no danger of the plug blowing from the opening and flooding a part of the field, to which sufficient water has already been supplied. When the plug is outwardly pulled with force, the converging edge portions 9 of the plate 6, effect a cam action to again contract the plate around the plug 3, so that said plate again relies upon contact of its smooth exterior with the wall of the opening 2, to hold the plug adjusted.

It will be seen from the foregoing that an extremely simple and inexpensive device has been provided for the desired purpose, yet that such device is very efficient and in every way desirable. As excellent results have been obtained from the details disclosed, they are by preference employed, but wthin the scope of the invention as claimed, modifications may of course be made.

I claim:

1. A water flow regulator comprising a plug adapted to be inserted different distances into an opening in a pipe, said plug being shaped to variably control the discharge of water through the opening by sliding it inwardly and outwardly, and resilient means carried by said plug for frictional contact with the wall of the opening to hold the plug in any position to which it is moved.

2. A water flow regulator comprising a plug adapted to be inserted different distances into an opening in a pipe, said plug being shaped to variably control the discharge of water through the opening by sliding it inwardly and outwardly, and a resilient plate curved around a portion of the plug for reception in the pipe opening to frictionally engage the wall of such opening and hold the plug in any position to which it may be moved, said plate being secured to the plug and having a tendency to assume a position out of concentric relation with said plug.

3. A water flow regulator comprising a plug adapted to be inserted different distances into an opening in a pipe, said plug being shaped to variably control the discharge of water through the opening by sliding it inwardly and outwardly, and a resilient plate curved around a portion of the plug for reception in the pipe opening to frictionally engage the wall of such opening and hold the plug in any position to which it may be moved, said plate having opposite edges extending longitudinally of the plug and having a tendency to move outwardly from said plug under the resiliency of the plate, the latter being secured to the plug between said edges.

4. A structure as specified in claim 3; the end portions of said edges toward the outer end of the plug being disposed in converging relation for the purpose set forth.

In testimony whereof I have hereunto affixed my signature.

ALBERT E. RASMUSSEN.